United States Patent [19]

Armand et al.

[11] Patent Number: 5,162,177

[45] Date of Patent: * Nov. 10, 1992

[54] ION CONDUCTIVE MATERIAL COMPOSED OF A SALT IN SOLUTION IN A LIQUID ELECTROLYTE

[75] Inventors: Michel Armand, Les Corjons, France; Michel Gauthier, La Prairie, Canada; Daniel Muller, Pau, France

[73] Assignees: Hydro-Quebec, Montreal, Canada; Societe Nationale Elf Aquitaine, Courbevoie, France

[*] Notice: The portion of the term of this patent subsequent to Jun. 4, 2008 has been disclaimed.

[21] Appl. No.: 672,327

[22] Filed: Mar. 20, 1991

Related U.S. Application Data

[62] Division of Ser. No. 467,358, Jan. 23, 1990, Pat. No. 5,021,308, which is a division of Ser. No. 224,915, Jun. 30, 1988, abandoned.

[30] Foreign Application Priority Data

Oct. 30, 1986 [FR] France .................................. 86 15114

[51] Int. Cl.$^5$ .............................................. H01M 6/16
[52] U.S. Cl. ......................................... 429/194; 429/50; 429/197; 429/192; 252/62.2
[58] Field of Search ............... 429/194, 196, 197, 192, 429/50; 252/62.6; 528/14, 15, 17, 18, 21, 23

[56] References Cited

U.S. PATENT DOCUMENTS 4,505,997 3/1985 Armand et al. ...................... 429/192
5,021,308 6/1991 Armand et al. ...................... 429/194

*Primary Examiner*—Anthony Skapars
*Attorney, Agent, or Firm*—Oblon, Spivak, McClelland, Maier & Neustadt

[57] ABSTRACT

Ionically conductive material consisting essentially of a salt diluted in a liquid aprotic solvent. The salt is represented by one of the following formulas:

$$M[R_F-SO_2-N-SO_2R'_F] \quad (I)$$

$$M[R_F-SO_2-N-CO-R'_F] \quad (II)$$

$$M[R_F-CO-N-CO-R'_F] \quad (III)$$

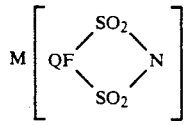

(IV)

where M is an alkaline or alkaline earth metal, a transition metal or a rare earth metal.

11 Claims, No Drawings

ION CONDUCTIVE MATERIAL COMPOSED OF A SALT IN SOLUTION IN A LIQUID ELECTROLYTE

This is a division of application Ser. No. 07/467,358, filed on Jan. 23, 1990, now U.S. Pat. No. 5,021,308 which is a division of application Ser. No. 07/224,915, filed on Jun. 30, 1988, now abandoned which is the National Phase of PCT/FR87/00428.

The present invention relates to a new ion conductive material which can be used in particular as a liquid electrolyte for producing both primary and secondary electrochemical current generators.

U.S. Pat. No. 4,505,997 describes and claims salts, which can be used in particular for producing solid electrolytes and which are called alkaline metal bis-perhalogenoacyl or sulfonylamides.

In accordance with the invention, the ion conductive material is composed of a salt in solution in a liquid solvent, with said salt being represented by one of the following formulas:

$$M[RF-SO_2-N-SO_2-R'F] \quad (I)$$

$$M[RF-SO_2-N-CO-R'F] \quad (II)$$

$$M[RF-CO-N-CO-R'F] \quad (III)$$

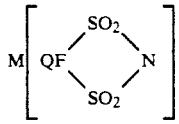

(IV)

wherein:

M is an alkaline or alkaline earth metal, a transition metal or a rare earth,

RF and R'F, which are identical or different, each represent a perhalogen radical, which is preferably perfluorinated, having from 1 to 12 carbon atoms, QF is a perfluorinated bivalent radical having from 2 to 6 carbon atoms.

Preferably, QF is $C_2F_4$ or $C_3F_6$ and for the compounds of formula (I), the RF and R'F radicals are identical and represent $CF_3$.

In accordance with another characteristic of the invention, the above salts are dissolved in a polar aprotic liquid solvent, selected from among linear ethers, such as diethylether, dimethoxyethane or cyclic ethers, such as tetrahydrofuran, dioxane or dimethyltetrahydrofuran, esters, such as methyl or ethyl formate, propylene or ethylene carbonate, or butyrolactones, nitriles, acetonitriles, benzonitriles, nitrate derivatives, such as nitromethane or nitrobenzene, amides, such as dimethylformamide, diethylformamide and N-methylpyrolidone, sulfones, such as dimethylsulfone, tetramethylene sulfone and other sulfolanes.

In effect, in a surprising manner, these salts have high solubility in these different types of solvents, with said solubility being greater than that of the salts used in liquid electrochemistry, for example the perchlorates.

In addition, the thermal, chemical and electrochemical stability of the solutions thus produced is remarkable. In particular, the reduction of the corresponding anion is not observed before the deposit of the metal and oxidation takes place at an electrochemical voltage of greater than 4 Volts as compared to a lithium electrode.

These new liquid electrolytes are also of interest with regard to the possibility they offer of very easily producing rechargeable generators operating over a very large number of cycles, greater than 100, even 500.

The following examples are given to illustrate the invention but should not be considered as limiting it.

EXAMPLE 1

An electrochemical generator of the lithium/$TiS_2$ type was produced using a thin sheet of lithium 200 microns thick as the negative electrode and, as the positive electrode, a porous electrode formed by pressing a $TiS_2$ powder with a grain size of approximately 10 microns, PTFE latex and carbon black in the following amounts:

| | |
|---|---|
| $TiS_2$ powder: | 80% by weight |
| PTFE: | 10% by weight |
| carbon black: | 10% by weight |

The pressing was carried out on a 50 micron thick expanded nickel collector and the electrode assembled in this manner had a thickness of 200 microns.

The electrolyte was composed of a 2M solution of $Li(CF_3SO_2)_2N$ in propylene carbonate impregnating a microporous glass fiber separator.

In this manner, it could be checked that the generator operated reversibly at room temperature over a number of cycles greater than 100.

The same generator was produced, but the lithium salt was in solution in a 1M solution of tetrahydrofuran (THF).

Similarly, several generators were cycled successfully and had the following characteristics.

EXAMPLE 2

Negative electrode composed of a strip of lithium, positive electrode composed of molybdenum sulfide, $MoS_2$, sintered on an aluminum collector and having a total thickness of 100 microns. The electrolyte was composed of a 1M solution of $Li(CF_3SO_2)_2N$ in a mixture of propylene carbonate (40% by volume) and ethylene carbonate (60% by volume).

EXAMPLE 3

Identical to Example 2 except that the solvent was a mixture of 40% propylene carbonate and 60% dimethoxyethane.

EXAMPLE 4

A generator identical to that of Example 3 was produced, except that the positive electrode material was a fluorinated polycarbon with the formula $CF_x$, as described and claimed in European Patent Application No. 0157818.

EXAMPLE 5

The generator was identical to that of Example 2, except that the salt in solution was a cyclic salt with the formula:

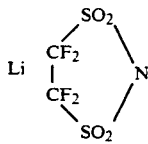

The salt was prepared using the synthesis method described in European Patent Application No. 0057327.

EXAMPLE 6

A generator was cycled at room temperature, in which the positive electrode was composed of a manganese oxide $M_nO_2$ and the electrolyte was a 1M solution of $Li(CF_3SO_2)_2N$ in a mixture of dimethoxyethane (50% by volume) and sulfolane.

The following examples relate to the use of the new ion conductive materials in accordance with the invention for applications other than as electrochemical generators.

EXAMPLES 7, 8, 9, 10

Production of organic cation radicals.

7) A perilene cation radical was prepared in an electrochemical cell containing a 1M solution of $Li(CF_3SO_2)_2N$ in a nitromethane as the support electrolyte using anodic oxidation on platinum at a voltage of 1.5 Volts in relation to a silver electrode. In this manner perilene crystals were obtained which ar represented by the formula

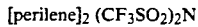
[perilene]$_2$ (CF$_3$SO$_2$)$_2$N

These crystals are semiconductors and have greater stability than when a lithium perchlorate is used as the salt in solution in the support electrolyte.

8) A poly(pyrrole) was prepared by oxidation of the monomer in a 0.1M solution of $Li(C_4F_9SO_2)_2N$ in acetonitrile. In this manner an anodic film was obtained which was a very good conductor (100 ohm$^{-1}$cm$^{-1}$), stable in air and in humidity. 9) As in Example 8, a poly(pyrrole) was prepared by using a 0.1M solution of

K [CF$_3$SO$_2$—N—CO—CF$_3$]

in acetonitrile.

A film with conductivity on the order of 500 ohm$^{-1}$ cm$^{-1}$ was obtained.

10) A poly(aniline) was prepared by anodic oxidation on the monomer in a 1M solution of $Na(CF_3SO_2)_2N$ in $CH_3NO_2$.

A film with conductivity greater than 100 ohm$^{-1}$ cm$^{-1}$ was obtained.

The same film, except produced in thiophene, had conductivity on the order of 200 ohm$^{-1}$ cm$^{-1}$.

EXAMPLE 11

This example relates to the use of the new materials in accordance with the invention for the doping of polymers, such as poly(acetylene). A poly(acetylene) film was electrochemically doped in a solution of $K(CF_3SO_2)_2N$ in nitromethane. The film obtained was stable in air with conductivity on the order of 1000 ohm$^{-1}$ cm$^{-1}$.

Thus, it is clearly apparent from these examples that the interest of these new ion conductive materials resides not only in the production of electrochemical generators which are rechargeable over a large number of cycles, but also for:

the preparation of stable organic cation radicals such as those of hexamethoxydiphenylamine or tetrathiofulvalene or condensed polyaromatics, the doping of polymers with conjugated bonds of the polyaniline, polyacetylene, polythiophene or polypyrrole type.

We claim:

1. In an electrochemical cell containing positive electrode, a negative electrode and a liquid electrolyte, the improvement wherein said liquid electrolyte comprises a polar aprotic solvent and a salt selected from the group consisting of:

M [RF—SO$_2$—N—SO$_2$R'F]     (I)

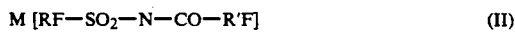
M [RF—SO$_2$—N—CO—R'F]     (II)

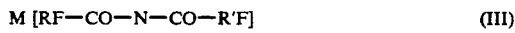
M [RF—CO—N—CO—R'F]     (III)

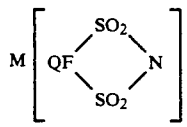
(IV)

wherein;

M is an alkaline or alkaline earth metal, a transition metal or a rare earth metal, RF and R'F are identical or different and each represents a perhalogen radical having from 1 to 12 carbon atoms, and QF is a perfluorinated bivalent radical having from 2 to 6 carbon atoms.

2. The electrochemical cell of claim 1, wherein the negative electrode comprises lithium.

3. The electrochemical cell of claim 1, wherein M is lithium.

4. The electrochemical cell of claim 1, wherein the polar aprotic solvent is selected from at last one solvent from the group consisting of linear ethers, cyclic ethers, esters, carbonates, lactones, nitriles, nitrate derivatives, amides, sulfones, and sulfolanes.

5. The electrochemical cell of claim 1, wherein the polar aprotic solvent is at least one solvent selected from the group consisting of diethylether, dimethoxyethane, tetrahydrofuran, dioxane, dimethytetrahydrofuran, methyl formate, ethyl formate, propylene carbonate, ethylene carbonate, butyrolactones, acetonitrile, benzonitrile, nitromethane, nitrobenzene, dimethylformamide, diethylformamide, N-methylpyrolidone, dimethylsulfone, tetramethylene sulfone, sulfolane, and thiophene.

6. The electrochemical cell of claim 1, wherein said salt comprises $Li(CF_3SO_2)_2N$ dissolved in a polar aprotic solvent.

7. An electrochemical generator comprising an electrochemical cell according to any one of claim 1 to 6 in which the negative electrode comprises lithium.

8. Ion conductive material comprising a salt in solution in a liquid consisting essentially of at least one polar aprotic solvent selected from the group consisting of linear ethers, cyclic ethers, esters, carbonates, lactones, nitrate derivatives, amides, sulfones and sulfolanes wherein said salt is represented by one of the following formulas:

M [RF—SO₂—N—SO₂R'F]    (I)

M [RF—SO₂—N—CO—R'F]    (II)

M [RF—CO—N—CO—R'F]    (III)

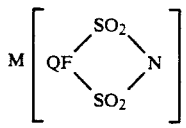    (IV)

wherein;

M is an alkaline or alkaline earth metal, a transition metal or a rare earth metal, RF and R'F are identical or different and each represent a perhalogen radical having from 1 to 12 carbon atoms, QF is a perfluorinated bivalent radical having from 2 to 6 carbon atoms.

9. Ion conductive material according to claim 8, wherein the polar aprotic solvent is at least one solvent selected from the group consisting of diethylether, dimethoxyethane, tetrahydrofuran, dioxane, dimethytetrahydrofuran, methyl formate, ethyl formate, propylene carbonate, ethylene carbonate, butyrolactones, nitromethane, nitrobenzene, dimethylformamide, diethylformamide, N-methylpyrolidone, dimethylsulfone, tetramethylene sulfone, sulfone, and thiophene.

10. Ion conductive material according to claim 8 where M is lithium.

11. Ion conductive material according to claim 8 consisting essentially of Li(CF₃SO₂)₂N dissolved in a polar aprotic solvent.

* * * * *

UNITED STATES PATENT AND TRADEMARK OFFICE
CERTIFICATE OF CORRECTION

PATENT NO. : 5,162,177
DATED : NOVEMBER 10, 1992
INVENTOR(S) : Michel ARMAND et al It is certified that error appears in the above-identified patent and that said Letters Patent is hereby corrected as shown below:

Column 3, line 15, change "$M_nO_2$" to --$MnO_2$--.

Column 4, line 49, change "dimethytetrahydrofurane" to --dimethyltetrahydrofurane--.

Column 6, line 14, change "..., sulfone,..." to --..., sulfolane,...--.

Signed and Sealed this

Thirtieth Day of November, 1993

BRUCE LEHMAN

Attest:

Attesting Officer

Commissioner of Patents and Trademarks